United States Patent
Paulson et al.

(10) Patent No.: US 10,799,835 B2
(45) Date of Patent: Oct. 13, 2020

(54) METHODS AND APPARATUSES FOR REDUCING MEMBRANE FOULING, SCALING, AND CONCENTRATION POLARIZATION USING ULTRASOUND WAVE ENERGY (USWE)

(71) Applicant: Pure Blue Tech Inc., Seattle, WA (US)

(72) Inventors: David Paulson, Minnetonka, MN (US); Ryan Vogel, Woodinville, WA (US); Adam Greenberg, Seattle, WA (US)

(73) Assignee: Pure Blue Tech Inc., Seattle, WA (US)

( * ) Notice: Subject to any disclaimer, the term of this patent is extended or adjusted under 35 U.S.C. 154(b) by 0 days.

(21) Appl. No.: 15/544,246

(22) PCT Filed: Jan. 17, 2016

(86) PCT No.: PCT/US2016/013766
§ 371 (c)(1),
(2) Date: Oct. 6, 2017

(87) PCT Pub. No.: WO2016/115555
PCT Pub. Date: Jul. 21, 2016

(65) Prior Publication Data
US 2018/0056244 A1    Mar. 1, 2018

Related U.S. Application Data

(60) Provisional application No. 62/104,540, filed on Jan. 16, 2015.

(51) Int. Cl.
*B01D 63/02* (2006.01)
*B01D 63/04* (2006.01)
*B01D 63/08* (2006.01)
*B01D 63/10* (2006.01)
(Continued)

(52) U.S. Cl.
CPC .......... *B01D 65/08* (2013.01); *B01D 63/026* (2013.01); *B01D 63/082* (2013.01); *B01D 63/106* (2013.01); *B01D 61/025* (2013.01); *B01D 63/02* (2013.01); *B01D 63/04* (2013.01); *B01D 63/10* (2013.01); *B01D 2321/2075* (2013.01)

(58) Field of Classification Search
None
See application file for complete search history.

(56) References Cited

U.S. PATENT DOCUMENTS

| 5,919,376 A | 7/1999 | Carman |
| 6,161,435 A | 12/2000 | Bond et al. |
| 7,008,540 B1 | 3/2006 | Weavers et al. |

(Continued)

FOREIGN PATENT DOCUMENTS

WO    2014071380 A1    5/2014

OTHER PUBLICATIONS

International Search Report and Written Opinion for PCT Application No. PCT/US2016/013766, dated Mar. 30, 2016, 12 pages.

*Primary Examiner* — Bradley R Spies
(74) *Attorney, Agent, or Firm* — Hans Santos, PLLC

(57) ABSTRACT

The present disclosure provides systems, devices, and methods for reducing membrane fouling, scaling, and concentration polarization in order to reduce system energy consumption, reduce operational system maintenance and plant downtime, reduce environmental impact and waste, and/or increase membrane flux and/or recovery.

33 Claims, 15 Drawing Sheets

(51) Int. Cl.
*B01D 65/08* (2006.01)
*B01D 61/02* (2006.01)

(56) References Cited

U.S. PATENT DOCUMENTS

| | | | |
|---|---|---|---|
| 2004/0016699 A1 | 1/2004 | Bayevsky | |
| 2008/0202242 A1 | 8/2008 | Mickols et al. | |
| 2011/0121574 A1* | 5/2011 | Konishi | B01D 61/025 290/54 |
| 2011/0123392 A1* | 5/2011 | Dionne | C02F 1/36 422/1 |
| 2015/0251141 A1* | 9/2015 | Mourad | B01D 65/08 210/636 |

* cited by examiner

METHODS AND APPARATUSES FOR REDUCING MEMBRANE FOULING, SCALING, AND CONCENTRATION POLARIZATION USING ULTRASOUND WAVE ENERGY (USWE)

RELATED APPLICATIONS

This application claims priority to U.S. Provisional Patent Application Ser. No. 62/104,540 filed Jan. 16, 2015, entitled METHODS AND APPARATUSES FOR REDUCING MEMBRANE FOULING, SCALING, AND CONCENTRATION POLARIZATION USING ULTRASOUND WAVE ENERGY (USWE), and Patent Cooperative Treaty Application No. PCT/US2016/013766, filed on Jan. 17, 2016, which is incorporated herein.

BACKGROUND

Membrane fouling is a process where solute or particles deposit onto a membrane surface or into membrane pores in a way that degrades the membrane's performance. Membrane fouling includes scaling/Inorganic fouling, particulate/colloid fouling, microbial/biological fouling and organic fouling. Membrane fouling is a phenomenon whereby particles block pores of the membrane, thereby reducing membrane lifetime/longevity, reducing membrane flux (e.g., water output per unit of time), and thus increases pump energy consumption, increases the required frequency of chemical cleaning which can be harmful to membranes, incurs a disposal/sewage cost, may be toxic to the environment, and requires plant downtime, human effort, and chemicals to regularly clean and occasionally replace membranes and/or membrane elements.

Similarly, concentration polarization is a phenomenon by which salts accumulate and concentrate on the feed side of the membrane, effectively reducing membrane flux. Concentration polarization leads to reduced membrane flux and increased probability of scale/fouling development. Thus, the performance and membrane lifetime can be deteriorated by concentration polarization.

SUMMARY

The present disclosure provides systems and methods that can reduce membrane fouling and concentration polarization by using Ultrasound Wave Energy (USWE). In some cases, reduced concentration polarization and fouling can be achieved by delivering energy to ultrasound emitting devices and enhancing the USWE effect of fouling mitigation by various approaches, including reflection and enhancing signal permeation through materials and increasing the time duration that each wave is active. USWE may reduce fouling, scaling, and concentration polarization by one or multiple mechanisms including cavitation, acoustic streaming and microstreaming, mechanical vibration, and particle charge interactions. This solution may be utilized for membranes in any variety of applications and industries including but not limited to desalination, drinking water, industrial and municipal wastewater purification and wastewater reuse, oil and gas, produced water, mining, construction, pharmaceutical, biomedical, irrigation, agriculture, food and beverage, cooling towers, textiles, semiconductor, manufacturing, pulp, and power.

An aspect provides methods and systems for reducing membrane fouling and concentration polarization. The system disclosed herein comprises a) a membrane that prevents at least one species in solution from passing through the membrane; b) an ultrasound generating device that generates and directs ultrasound wave energy (USWE) to the membrane(s); c) an energy delivering mechanism that delivers energy to the ultrasound generating device; and d) a container that houses the membrane(s), ultrasound generating device, and energy delivering mechanism.

In one embodiment, the ultrasound generating device employs a pulsing ultrasound wave. In another embodiment, the ultrasound generating device employs a continuous ultrasound wave. In another embodiment, the ultrasound generating device adjusts the USWE amplitude and frequency. In another embodiment, the ultrasound generating device comprises an ultrasound transducer that is formed of lead zirconium titanate (PZT).

In another embodiment, the membrane, or plurality of membranes in a membrane element or module (module and element are used within as interchangeable terms), comprises a permeate carrier with the ultrasound generating device embedded within. In another embodiment, membranes are rolled with permeate carriers and feed spacers as a spiral wound membrane element. This spiral wound membrane element may be a microfiltration, ultrafiltration, nanofiltration, or reverse osmosis membrane element. In another embodiment, the spiral wound membrane module/element comprises a central tube, and wherein the ultrasound generating device is located in, within the tube material, on, or coupled to the central tube of a spiral wound element.

In another embodiment, the membrane is a hollow fiber membrane or series of hollow fiber membranes arranged as a single element or module.

In another embodiment, the membrane is a flat-sheet membrane or series of flat-sheet membranes in a series of stacked plate-and-frame flat-sheet membranes, whereby the ultrasound generating devices are located between, in, alongside, above, below, behind, or otherwise adjacent to the membrane sheet or sheets.

In another embodiment, one or multiple reflective layers or surfaces are in the membrane element. In another embodiment, one or multiple reflective layers are in the membrane element casing. In another embodiment, one or multiple reflective layers are disposed between the container and the membrane(s). In another embodiment, one or multiple reflective layers are in, within the material of, on, or coupled to the pressure vessel. The pressure vessel itself may be the reflective layer. The membrane module casing itself may be the reflective layer. In another embodiment, the system further comprises a plurality of reflective layers.

Another aspect of the present invention disclosed herein is a method for species separation from a solution. The method comprises providing a separation system comprising (i) a membrane that prevents at least one species in the solution from passing through the membrane, (ii) an ultrasound generating device that generates and directs ultrasound wave energy (USWE) to the membrane, (iii) mechanism to deliver energy to the ultrasound generating device(s), and (iv) a container that houses the membrane(s), ultrasound generating device, and mechanisms to deliver energy to the ultrasound generating device; b) directing a solution through the membrane to separate the at least one species from the solution; c) directing USWE from the ultrasound generating device to the membrane and d) delivering energy to the ultrasound generating devices.

In one embodiment, the ultrasound generating device employs a pulsing ultrasound wave. In another embodiment, the ultrasound generating device employs a continuous ultrasound wave. In another embodiment, the ultrasound generating device adjusts the USWE amplitude and frequency. In another embodiment, the ultrasound generating device comprises an ultrasound transducer that is formed of lead zirconium titanate (PZT). In another embodiment, the ultrasound generating device comprises an ultrasound transducer formed of any other ultrasound generating material or materials.

In another embodiment, the membrane element comprises a permeate carrier with the ultrasound generating device embedded within the permeate tube, its material, coupled to, or outside the tube. In another embodiment, the membrane is a spiral wound reverse osmosis membrane. In another embodiment, the spiral wound reverse osmosis membrane comprises a central tube, and wherein the ultrasound generating device is located within or on the central tube of a spiral wound element. In another embodiment, the membrane is a hollow fiber membrane.

In another embodiment, one or multiple reflective layers are in between membranes and/or within the membrane element. In another embodiment, one or multiple reflective layers are in the container. In another embodiment, one or multiple reflective layers are disposed between the container and the membrane. In another embodiment, the system further comprises a plurality of reflective layers.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein), of which:

DETAILED DESCRIPTION

Figure 1:
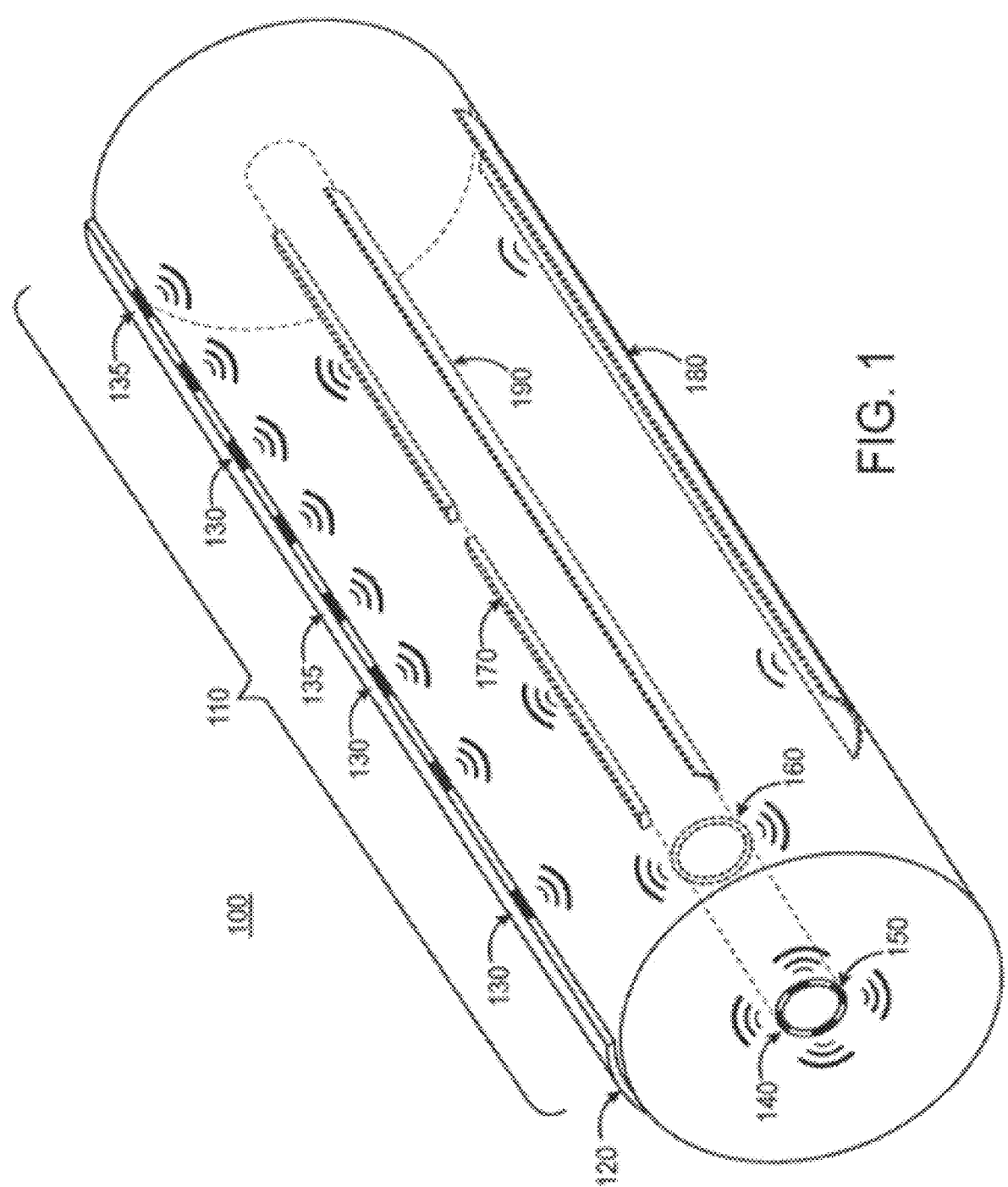
FIG. 1 is a perspective view of an ultrasonically cleaned membrane embedded with Ultrasound Wave Energy (USWE) transducers according to an embodiment of the present invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein and in the appended claims, the singular forms "a", "an", and "the" include plural referents unless the context clearly dictates otherwise. Thus, for example, reference to "a device" includes a plurality of such devices and reference to "the membrane" includes reference to one or more membranes and equivalents thereof, e.g., membrane element(s), known to those skilled in the art, and so forth. In some embodiments, when used in the specification and claims, reference to "a membrane" includes reference to "a membrane element." Similarly, reference to "a membrane element" includes reference to "a membrane."

Unless otherwise indicated, the term "central tube" is interchangeable with "permeate tube."

Unless otherwise indicated, open terms for example "contain," "containing," "include," "including," and the like mean comprising.

Where a range of values is provided, it is understood that each intervening value between the upper and lower limits of that range, to the tenth of the unit of the lower limit, unless the context clearly dictates otherwise, is also specifically disclosed. Each smaller range between any stated value or intervening value in a stated range, and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Introduction

The present disclosure provides systems, apparatuses and methods for reducing membrane fouling, scaling, and concentration polarization using Ultrasound Wave Energy (USWE). In some cases, the present systems, apparatuses and methods may be configured to direct ultrasonic waves at a membrane, or many or all membranes, of the membrane assembly, configured together as a membrane module or membrane element. The ultrasonic waves may be produced by a piezoelectric material. Further, in some cases, the ultrasonic waves may induce oscillations at the surface of the membrane and thereby prevent mineral particles and/or organic matters from settling on the membrane and/or cause at least some of any such settled particles to detach from the membrane. As a result, the membrane assembly described herein may be utilized to increase the efficacy and/or the longevity of the membrane, and thereby reduce the operating costs of treatment systems that utilize membranes.

In an implementation, the disclosed membrane assembly may be employed in an ultrafiltration, reverse osmosis, or other membrane treatment system. Traditionally, in such a system, scaling, fouling, and high velocity propulsion of solutions may decrease the lifetime and/or the efficacy of a membrane. Additional undesirable byproducts of such systems may also include harmful chemicals that are deposited in the environment. The membrane assembly described herein may help reduce fouling and scaling and may help reduce the necessary propulsion velocity of the solutions.

For purposes of context and explanation only, an example system that incorporates the disclosed membrane assembly is discussed. However, it should be understood that aspects of the disclosed membrane assembly described herein may be utilized in other systems and/or contexts, including other treatment systems. Thus, the example treatment system discussed below should be understood to be but one example of a treatment system in which the disclosed membrane assembly may be utilized, and therefore should not be taken to be limiting.

Membrane and Membrane Element

The systems and methods disclosed herein comprise a membrane that prevents at least one species in solution from passing through the membrane. Examples of different types of filtration membranes and membrane elements suitable for use with the present invention include, but not limited to, flat sheet, tubular, spiral wound, hollow fiber, microfiltration, ultrafiltration, nanofiltration, reverse osmosis, and forward osmosis membranes and membrane elements. For example, the membrane can be a spiral wound membrane element. In particular, spiral wound reverse osmosis membrane element is a preferred membrane of the present invention.

In one case, the membrane element comprises a mesh spacer lying between membranes within a spiral wound configuration. Vibratory motion can be introduced within the mesh spacer between membranes within a spiral wound configuration. Vibratory motion can be introduced within mesh spacer necessary to cause the cleaning phenomenon. A similar action occurs when the mesh spacer lies between the membrane and the core of the tubular configuration. Each section of the mesh spacer and membrane reacts to vibratory motion as a separate diaphragm thus providing uniform cleaning throughout the length of the membrane. Vibration below cavitation frequency can be used in this instance. A resonant condition can be established in this configuration by optimizing the geometry of the mesh and the frequency of the ultrasonic energy impinging on it, and therefore cleaning may be accomplished without the aid of cavitation.

In one case, the membrane comprises metallic particles in one or some of the membrane, feed spacer, or permeate carrier materials to reduce ultrasound attenuation (e.g., loss of intensity through a medium). Alternatively, layer(s) of graphene or other conductive film may be inserted in one or some of the membrane element materials to reduce ultrasonic attenuation.

In a typical membrane element for seawater purification/desalting or other chemical applications, a thin-film composite (TFC) membrane can be used. The TFC membrane may comprise a polyester non-woven fabric substrate, which can be 10-1000 microns thick. For example, the polyester non-woven fabric substrate can be at least 10, 20, 30, 40, 50, 60, 70, 80, 90, 100, 200, 300, 400, 500, 600, 700, 800, 900, or 1000 microns thick, and preferably 200-400 microns thick. The TFC membrane may comprise polysulfone cast over a non-woven polyester fabric. This polysulfone support membrane can be 5-500 microns thick. For example, the polysulfone membrane can be at least 5, 6, 7, 8, 9, 10, 20, 30, 40, 50, 60, 70, 80, 90, 100, 200, 300, 400, or 500 microns thick, and preferably 40-50 micrometers (microns) thick. The TFC membrane may comprise a polyamide barrier layer, which can be obtained by reacting m-Phenelynediamine with trimesoyl chloride. The polyamide barrier layer can be 10-1000 nanometers thick. For example, the polyamide barrier layer can be at least 10, 20, 30, 40, 50, 60, 70, 80, 90, 100, 200, 300, 400, 500, 600, 700, 800, 900, or 1000 nanometers thick, and preferably 200-300 nanometers thick. The TFC membrane module may comprise a permeate carrier, which is made of melamine or epoxy impregnated tricot weave polyester. The permeate carrier can be 1-100 mils thick. For example, the permeate carrier can be at least 1, 2, 3, 4, 5, 6, 7, 8, 9, 10, 20, 30, 40, 50, 60, 70, 80, 90, or 100 mils thick, and preferably 8-9 mils thick. The TFC membrane module may comprise a permeate tube, which can be extruded thermoplastic, including polysulfone, polyvinyl chloride (PVC), chlorinated polyvinyl chloride (CPVC), and fibre-reinforced plastic (FRP). The permeate tube can be 0.1-10 inch OD. For example, the permeate tube can be at least 0.10, 0.20, 0.30, 0.40, 0.50, 0.60, 0.70, 0.80, 0.90, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10.0 inch OD, and preferably 1.5 inch OD. The permeate tube may have 0.01-0.5 inch wall thickness. For example, the permeate tube can be at least 0.01, 0.02, 0.03, 0.04, 0.05, 0.10, 0.15, 0.20, 0.25, 0.30, 0.35, 0.40, 0.45, or 0.50 inch wall thickness, and preferably 0.15-0.17 inch wall thickness. The TFC membrane module may comprise a fiberglass and epoxy shell, which can house the above materials.

The membrane module may further comprise a mesh spacer. The mesh spacer can be 1 to 500 mils thick. For example, the permeate tube can be at least 1, 2, 3, 4, 5, 6, 7, 8, 9, 10, 20, 30, 40, 50, 60, 70, 80, 90, 100, 200, 300, 400, or 500 mils thick, and preferably 35 mils (0.86 mm) thick. In another case, the mesh spacer may comprise a co-extruded diamond mesh. The co-extruded diamond mesh may have 5% to 95% material. For example, the co-extruded diamond mesh can have at least 5%, 6%, 7%, 8%, 9%, 10%, 15%, 20%, 25%, 30%, 35%, 40%, 45%, 50%, 55%, 60%, 65%, 70%, 75%, 80%, 85%, or 90% material, and preferably 40-45% material. The co-extruded diamond mesh may have 5% to 95% open space. For example, the co-extruded diamond mesh can have at least 5%, 6%, 7%, 8%, 9%, 10%, 15%, 20%, 25%, 30%, 35%, 40%, 45%, 50%, 55%, 60%, 65%, 70%, 75%, 80%, 85%, or 90% open space, and preferably 40-45% open space. In one case, the mesh spacer may comprise polypropylene. In another case, the mesh spacer may comprise polyethylene. In another case, the mesh spacer may comprise polypropylene and polyethylene. In another case, the mesh spacer may comprise nylon.

Ultrasound Generating Device

The systems and methods comprise an ultrasound generating device that generates and directs ultrasound wave energy (USWE) to the membrane. In particular, the ultrasound generating devices may comprise USWE transducers. In some cases, the USWE transducers are placed in a manner to transmit the USWE in a radial direction from the axial center of the device. In some cases, the USWE transducers are placed in a manner to transmit the USWE in a radial direction from the axial center of the device. In some cases, the USWE transducers are placed on the permeate tube in a circumferential orientation. In some cases, the USWE transducers are placed on the permeate tube in an axial orientation. In some cases, the USWE transducers are placed within the plastic of the permeate tube.

USWE transducers can be placed during the molding or extrusion process. For example, the permeate tube, with the ultrasound transducers embedded within, can be molded in 6-12 inch pieces and assembled into whole 40-inch tubes. In some cases, the permeate tube can be molded in at least 0.1, 0.2, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, or 15.0 inch pieces. In some cases, the permeate tube can be assembled into at least whole 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 25, 30, 35, 40, 45, 50, 55, 60, 65, 70, 75, 80, 85, 90, 95, or 100-inch tubes. In an example, the permeate tube may be molded in pieces then bonded together. Alternatively, the permeate tube may be molded with continuous extrusion.

The ultrasound generating device may employ a pulsing or continuous ultrasound wave. Relative to continuous USWE, Pulsing USWE may reduce energy consumption. In some cases, the USWE amplitude and frequency may be varied per the operators' needs and per the fouling characteristics of the water, wastewater, or fluid being treated. The varying USWE amplitude and frequency may maximize fouling-mitigating benefit and prevent membrane damage from the USWE.

The oscillations in at least a portion of the membrane may have a frequency and/or an amplitude that correspond to the parameters of the signals received by the USWE transducers. In some cases, the oscillations in at least a portion of the membrane may have an amplitude from at least about 50, 75, 100, 125, 150, 175, 200, 225, 250, 275, 300, 350, 400, 450, 500, 550, 600, 650, 700, 750, 800, 850, 900, 950, or 1,000 mVpp. In some cases, the oscillations in at least a portion of the membrane may have a frequency from at least about 1, 2, 3, 4, 5, 6, 7, 8, 9, 10, 20, 30, 40, 50, 60, 70, 80, 90, 100, 200, 300, 400, 500, 600, 700, 800, or 900 kHz. In some cases, the oscillations in at least a portion of the membrane may have a frequency from at least about 1, 2, 3, 4, 5, 6, 7, 8, 9, 10, 20, 30, 40, 50, 60, 70, 80, 90, 100, 200, 300, 400, 500, 600, 700, 800, or 900 MHz.

In an example, the ultrasound generating device may further comprise a control device. For example, causing the USWE transducers to produce ultrasonic waves may comprise the USWE transducers receiving pulsing signals or continuous signals from the control device and in response, the USWE transducers outputting ultrasound waves. In one case, the USWE transducers employ a continuous ultrasound wave. In another case, the USWE transducers employ a pulsing ultrasound wave. In some cases, the USWE transducers may receive a signal from the control device at least once every 1, 2, 3, 4, 5, 6, 7, 8, 9, 10, 20, 30, 40, 50, 60, 70, 80, 90, 100, 200, 300, 400, 500, 600, 700, 800, or 900 milliseconds. In some cases, the USWE transducers may receive a signal from the control device at least once every 1, 2, 3, 4, 5, 6, 7, 8, 9, 10, 20, 30, 40, or 50 seconds. In some cases, the USWE transducers may receive a signal from the control device at least once every 1, 2, 3, 4, 5, 6, 7, 8, 9, 10, 20, 30, 40, or 50 minutes. In some cases, the USWE transducers may receive a signal from the control device at least once every 1, 2, 3, 4, 5, 6, 7, 8, 9, 10, or 24 hours. In some cases, the pulses may be a predefined time duration.

The ultrasound generating device may have a duty cycle of 5% to 95%. For example, a 50% duty cycle can be 1 second on and 1 second off, and a 10% duty cycle can be 1 second on and 9 seconds off. For example, the ultrasound generating device has a duty cycle of 5%, 6%, 7%, 8%, 9%, 10%, 15%, 20%, 25%, 30%, 35%, 40%, 45%, 50%, 55%, 60%, 65%, 70%, 75%, 80%, 85%, 90%, or 95%.

In an example, the USWE transducer may comprise ceramic, polymeric, metallic, or a combination thereof. In particular, the USWE transducer may comprise a piezoelectric crystal, a piezoelectric ceramic, or a piezoelectric polymer. In one case, the USWE transducer comprises Lead Zirconium Titanate (PZT). In another case, the USWE transducer comprises polyvinylidene difluoride (PVDF). In another case, the USWE transducer comprises polyester. In another case, the USWE transducer comprises propylene.

Energy may be delivered to the USWE transducers by various methods. In an example, energy is delivered to the USWE transducers by hardwiring. The wires may be located in, through, and/or between permeate tubes, interconnectors, anti-telescoping devices (ATDs), membranes, other module materials, pressure vessel, or module casing. In another case, energy is delivered to the USWE transducers wirelessly. In a preferred embodiment, the wiring may be embedded within the permeate tube of a spiral wound membrane element and to the adjacent permeate tube if applicable, whereby the wiring seamlessly connects to adjacent membrane elements in a pressure vessel. An electrical interconnection with a water-tight seal may be used to deliver power between transducers within tubes and other items in which the transducers may be embedded, coupled, or located.

The USWE transducers can be placed in one or more locations. In an example, the USWE transducers can be embedded in the permeate tube. In another case, the USWE transducers can be placed outside the permeate tube. In another case, the USWE transducers can be embedded in the membrane element. In another case, the USWE transducers can be placed inside the membrane element. In another case, the USWE transducers can be placed outside the membrane element. In another case, the USWE transducers can be embedded in the anti-telescoping device (ATD). In another case, the USWE transducers can be placed inside the interconnector or the entire interconnector itself can be a USWE transducer. In another case, the USWE transducers can be embedded in the mesh spacer. In another case, the USWE transducers can be placed on the mesh spacer. In another case, the USWE transducers can be embedded in the permeate spacer. In another case, the USWE transducers can be placed on the permeate tube. In another case, the USWE transducers can be embedded in the pressure vessel. In another case, the USWE transducers can be placed inside the pressure vessel. In another case, the USWE transducers can be placed outside the pressure vessel.

In an example, metallic particles are embedded into the membrane module materials. In another case, metallic pieces are embedded into the membrane module materials. In another case, one or multiple graphene layers are inserted into the membrane module or between the module materials.

Energy Delivering Mechanism

The systems and methods may comprise an energy delivering mechanism that connect and deliver energy to the ultrasound generating devices. This mechanism can be a wired or wireless energy delivering system. Many embodiments and geometries for the energy delivering mechanism exist. An energy delivering wire may enter the membrane element pressure vessel to the ultrasound generating devices. An energy delivering wire may travel along the inside of a grooved or non-grooved pressure vessel to the ultrasound generating devices. An energy delivering wire may enter the membrane element end caps to the ultrasound generating devices. An energy delivering wire may enter the membrane elements through the anti-telescoping devices (ATDs) to the ultrasound generating devices. An energy delivering wire may travel through the membrane element interconnectors to the ultrasound generating devices. An energy delivering wire may be in, on, or around the membrane element permeate tubes, connected to the ultrasound generating devices. A wireless energy delivery mechanism may be located outside the pressure vessel, wirelessly delivering energy to the ultrasound generating devices.

Container

The systems and methods comprise a container that houses the membrane, ultrasound generating device, and energy delivering mechanism. In some cases, the container is a pressure vessel.

Reflective Layer

The systems and methods may comprise at least one reflective layer that redirects the USWE from the ultrasound generating device to the membrane. The reflective layer may redirect the USWE to the membrane, and/or increase the signal transmittance through the membrane element, and/or increase the time duration that the ultrasonic wave is active, and thus maximize beneficial fouling-mitigating effect of the USWE.

Systems and Methods

FIG. 1 is a perspective view of an ultrasonically cleaned membrane embedded with Ultrasound Wave Energy (USWE) transducers according to an example of the present invention. A pump may pumps a feed solution source to provide the liquid to be filtered under pressure to the membrane filtration system. In one case, the membrane is a spiral wound membrane element 110.

In one case, the reflective layer 120 is placed on or outside the outer perimeter of the membrane element casting. In another case, the reflective layer 180 is placed inside the outer perimeter of the membrane element casting. In another case, the reflective layer 190 is placed on a permeate tube 140, preferably located at the center of the spiral wound membrane element 110. The filtered fluid may permeate the membrane element and be collected from the permeate tube 140.

In one case, the USWE transducers 130 are embedded in the outer perimeter of membrane element casting. In another case, the USWE transducers 135 are placed on the outer perimeter of membrane element casting. In another case, the USWE transducers 150 are embedded in the permeate tube 140. In another case, the USWE transducers 160 are in form of rings embedded in the permeate tube 140. In another case, the USWE transducers 170 are in form of bars embedded in the permeate tube 140.

Figure 2:
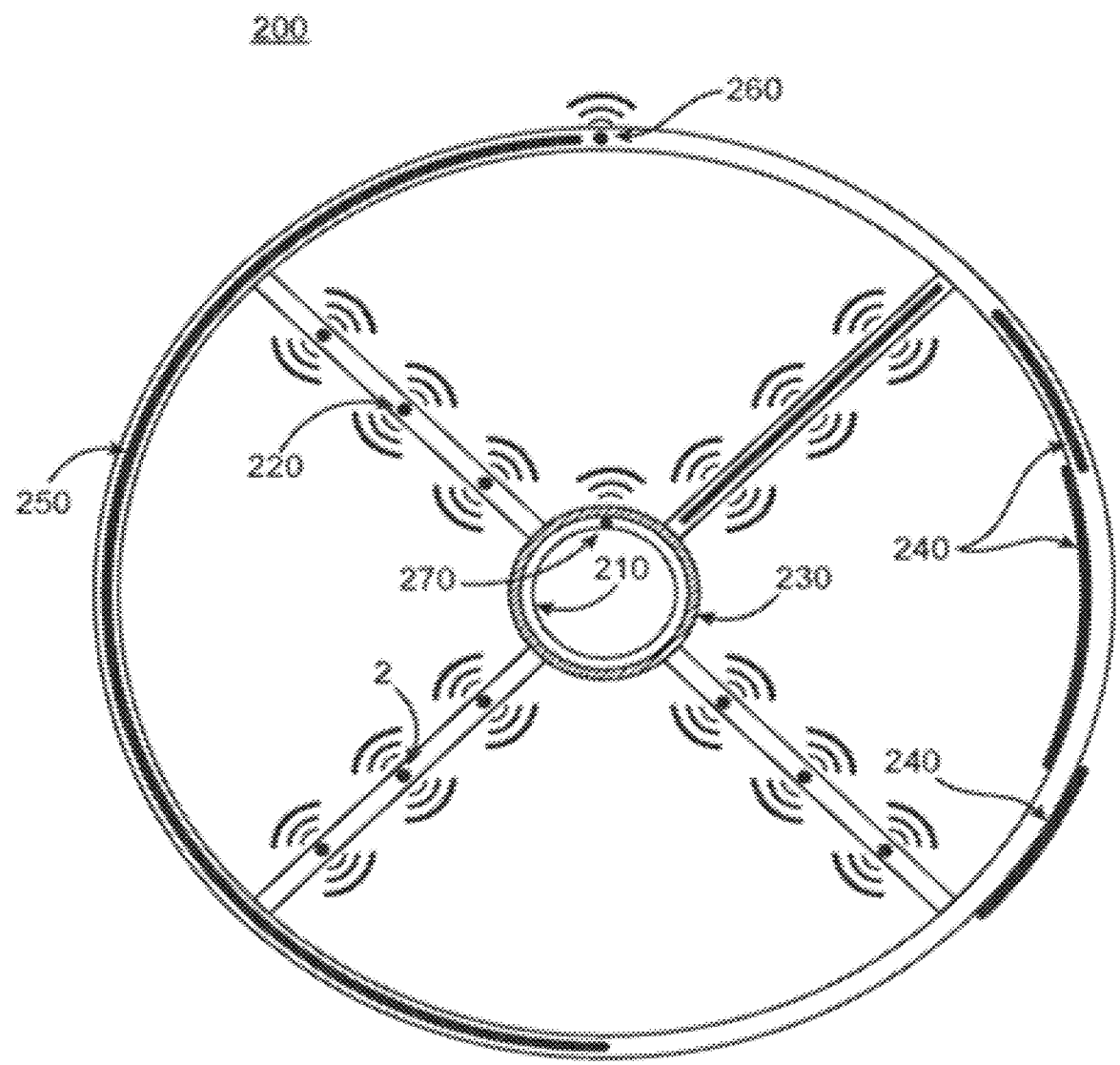
FIG. 2 is a cross-sectional view of an ultrasonically cleaned membrane coupled with an anti-telescoping device (ATD) according to another embodiment of the present invention.

FIG. 2 is a cross-sectional view of an ultrasonically cleaned membrane coupled with an anti-telescoping device (ATD) according to another case of the present invention. In some cases, the ATD is a plastic or metal device located on the ends of a reverse osmosis membrane element. In one case, the support device may be anti-telescoping device 200 configured to prevent the membrane assemblies and/or the outer wrap from unraveling and/or overextending. The support device may be configured to be placed over the outer wrap and receive the permeate tube 210 inserted into the support device. In an example, the USWE transducers 220 are embedded on and/or in the ATD. In another case, the reflective layer 230 is placed on and/or outside the permeate tube 210. The electrical energy can be delivered to the USWE generating device via hard wiring on and/or in the ATD 240. For example, the hard wiring can be placed within, outside, and/or inside the ATD.

Figure 3:
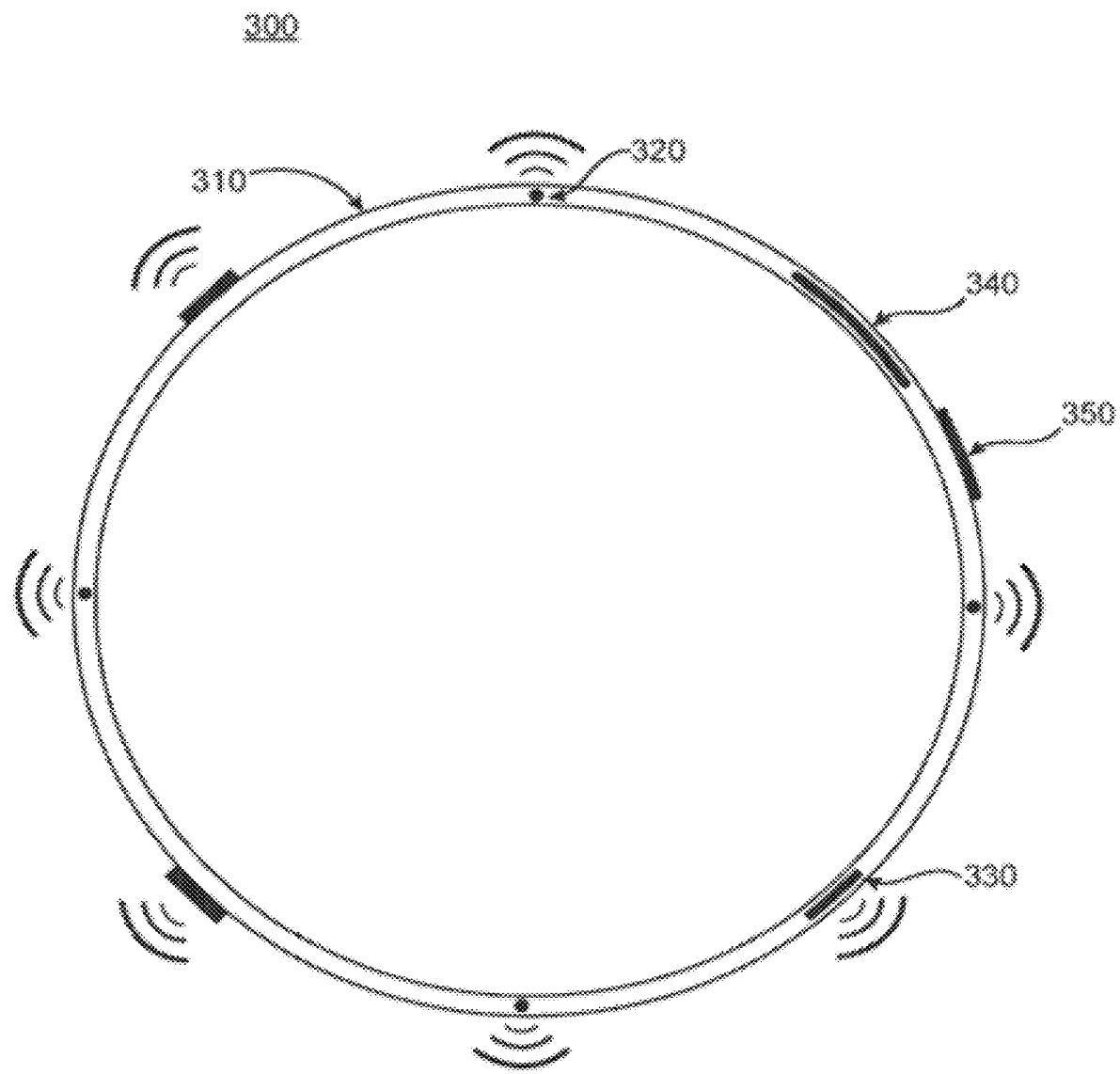
FIG. 3 is a cross-sectional view of a permeate tube of an ultrasonically cleaned membrane according to another embodiment of the present invention.

FIG. 3 is a cross-sectional view of a permeate tube 310 of an ultrasonically cleaned membrane according to another case of the present invention. In an example, the USWE transducers 320 are embedded in the permeate tube 310. In another case, the USWE transducers 330 are placed outside of the permeate tube 310. In certain cases, the USWE transducers are placed in and/or on the permeate carrier fabric. The electrical energy can be delivered to the USWE generating device via hard wiring on and/or in the permeate 310. In an example, the hard wiring can be molded 340 into the permeate tube 310. In another case, the hard wiring can be co-extruded 350 in the permeate tube 310. In another case, the hard wiring can be placed in grooves in the permeate tube 310.

Figure 4:
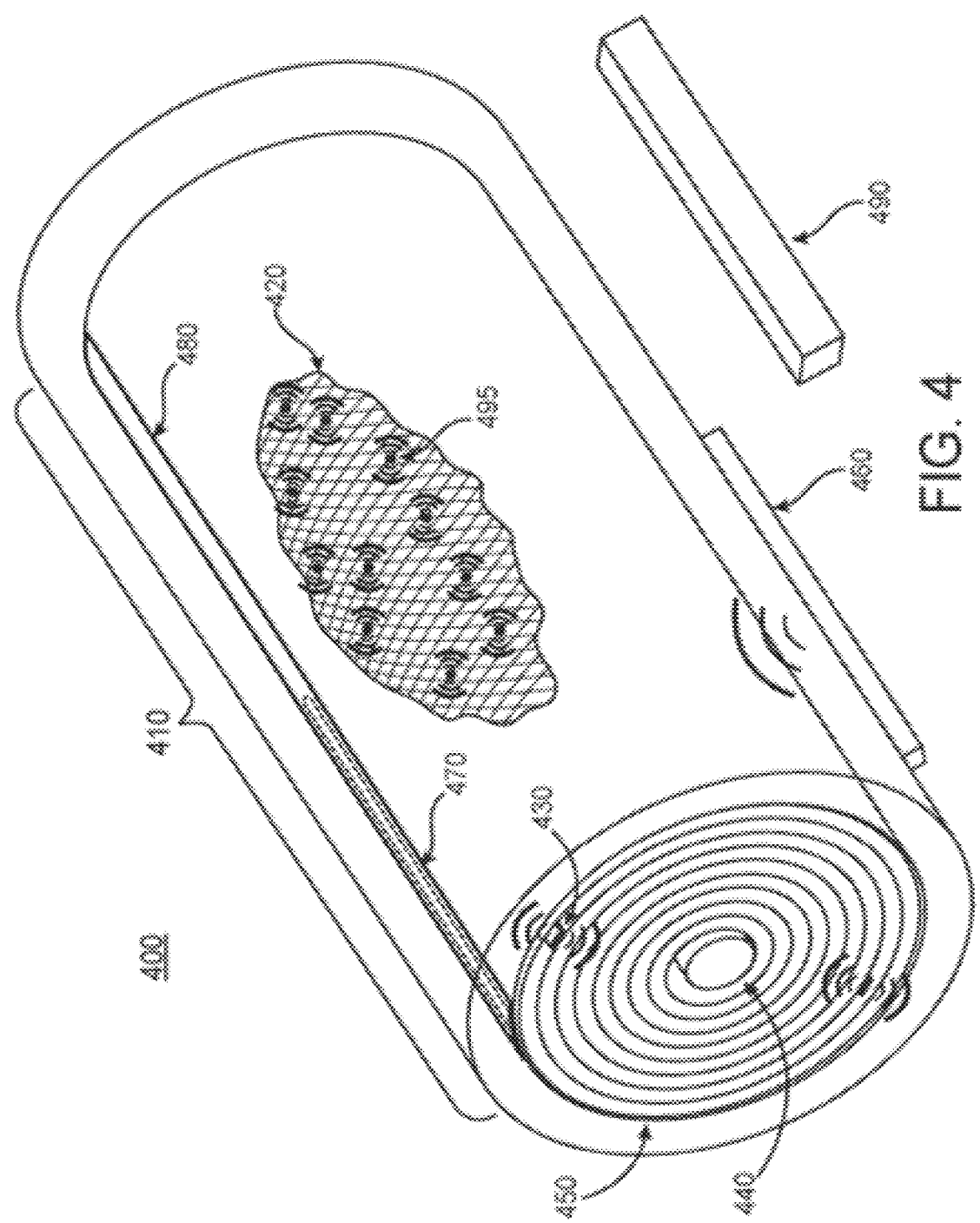
FIG. 4 is a perspective view of an ultrasonically cleaned membrane housed in a container according to another embodiment of the present invention.

FIG. 4 is a perspective view of an ultrasonically cleaned membrane housed in a container according to another case of the present invention. In an example, a pump may be configured to pressurize the solution to a specific pressure when the solution is passed through the membrane. In another case, the pump may be configured to pressurize the solution to a specific velocity when the solution is passed through the membrane. In another case, the pump may be configured to receive a signal from the control device and pressurize the solution according to the received signal.

In one example, the specific pressure may be a pressure at least 10 pounds per square inch (psi). For example, the pressure can be at least 10, 20, 30, 40, 50, 75, 100, 125, 150, 175, 200, 225, 250, 275, 300, 350, 400, 450, 500, 550, 600, 650, 700, 750, 800, 850, 900, 950, 1,000, 1100, 1200, 1300, 1400, or 1500 psi. In another example, the predefined pressure may be a pressure from a range of pressures including 900 psi to 1100 psi. In other examples, the predefined pressure may be a pressure from about 250 psi to 1200 psi.

As shown in FIG. 4, a spiral wound membrane element 450 is placed inside a pressure vessel 410. In an example, the USWE transducers 420 are embedded on and/or on one or more mesh feed spacers. In particular, the mesh feed spacer may be a metal fiber woven into a feed spacer, preferably a polymeric feed channel spacer. In another case, the USWE transducers 420 are embedded on and/or on one or more permeate spacers. In particular, the mesh feed spacer may be a metal mesh placed inside or wrapped on the permeate tube 440. With respect to the spacers as discussed herein, a spacer may be a material configured to support a membrane and facilitate the flow of fluid to the membrane. In some cases, the spacer may include a non-liquid material physically coupled to the membrane. In one case, a spacer may be made out of a porous material. For example, a spacer may be made out of a porous plastic, among other materials. In other cases, a spacer may be configured to direct ultrasonic waves at a membrane. As such, the spacer may be made wholly or partially out of a permeable or impermeable piezoelectric material, such as a piezoelectric polymer.

In another case, the USWE transducers 430 are embedded on and/or on the membrane layers. In another case, the USWE transducers 460 are placed outside the pressure vessel 410. In certain cases, the systems and methods provide frequency modulating sweeps of vibrational energy comprising an USWE transducer 460 slideably mounted about the exterior of the pressure vessel 410 and which is physically and automatically moved back and forth along the length of the pressure vessel 410 during the cleaning process.

The electrical energy can be delivered to the USWE generating device via hard wiring. In an example, the hard wiring can be molded 470 into the outer jacket 480 of the membrane element 450. In another case, the hard wiring can be co-extruded in the outer cover 480 of the membrane element 450. In another case, the hard wiring can be placed in grooves in the outer cover 480 of the membrane element 450. In another case, the hard wiring can be placed within the pressure vessel end caps. In another case, the hard wiring can be attached to inner surface of the pressure vessel. In some cases, the inner surface of the pressure vessel is customized. In certain cases, the energy can be delivered wirelessly from an emitter outside the pressure vessel 490.

The reflective layer may comprise a metal mesh. In one case, the reflective layer is placed inside or wrapped inside the outer perimeter of the membrane element casting 480. In another case, the reflective layer is placed inside or wrapped on the permeate tube 440, preferably located at the center of the spiral wound membrane element 450. In another case, the reflective layer is placed inside or wrapped inside the pressure vessel wall 410. In another case, the reflective layer is molded or extruded inside the pressure vessel wall 410.

In another case, metallic pieces and/or particles 495 are inserted into and/or on membrane materials to reduce ultrasound attenuation.

Figure 5:
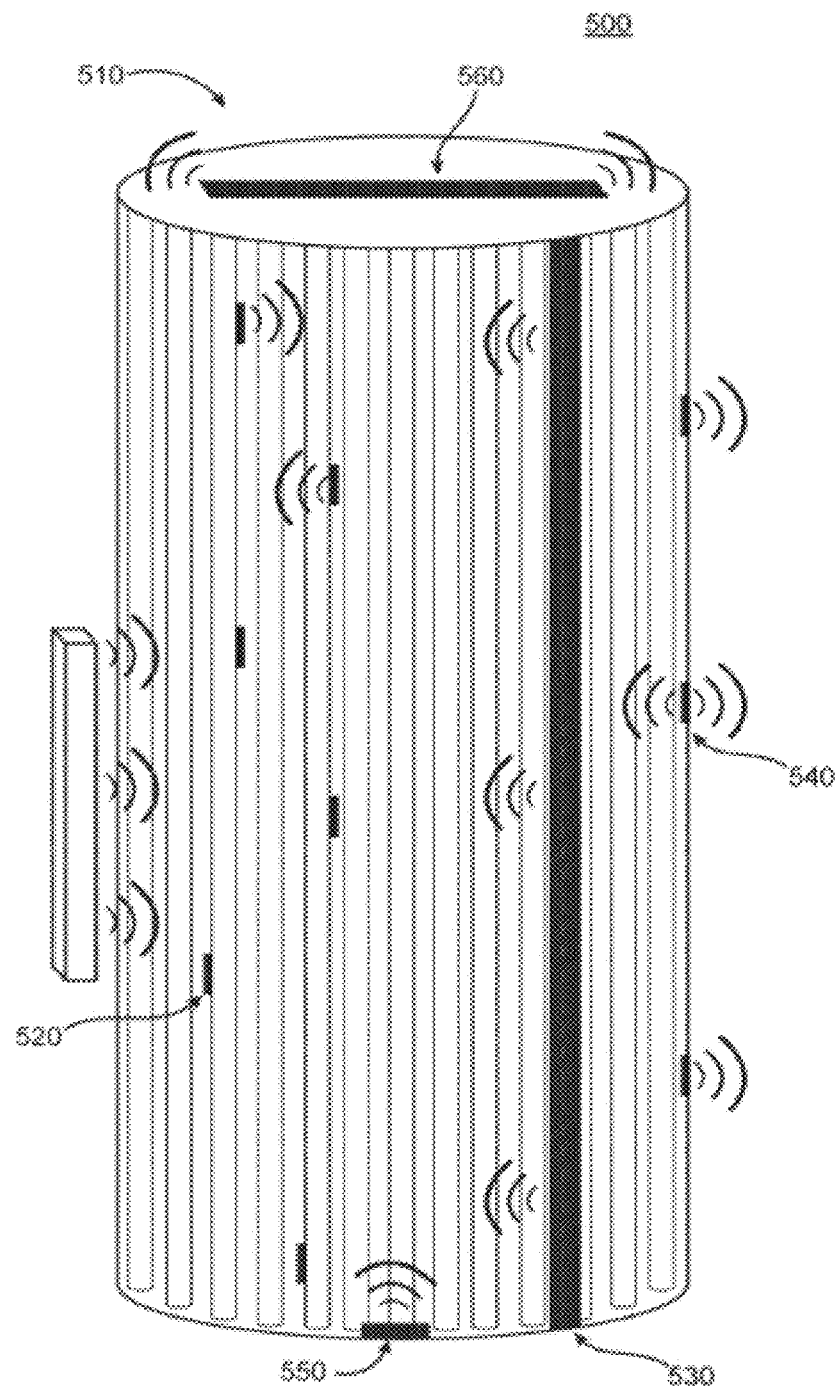
FIG. 5 is a perspective view of an ultrasonically cleaned hollow fiber membrane according to another embodiment of the present invention.

FIG. 5 is a perspective view of an ultrasonically cleaned hollow fiber membrane according to another case of the present invention. In one case, the USWE transducers are embedded on the membrane hollow fibers 520. In another case, the USWE transducers are embedded on an inner wall of a hollow fiber membrane 540 and/or on an outer shell that contains the hollow fiber membrane. In another case, the USWE transducers are in and/or on 530 the hollow fiber membrane. For example, the USWE transducers may be adjacent to hollow fibers and parallel with the fibers. In another case, the USWE transducers are in 550 and/or on 560 the hollow fiber membrane, perpendicular to hollow fibers.

Figure 6:
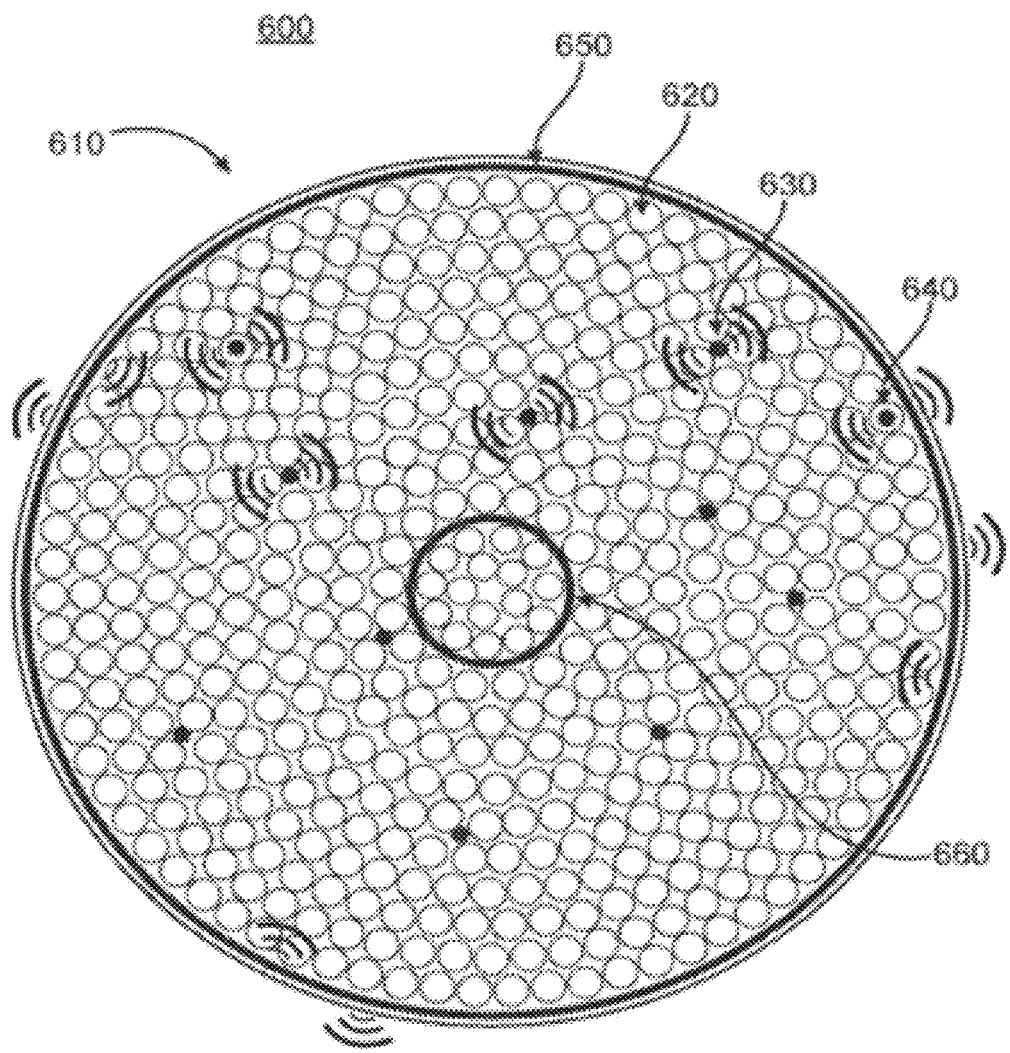
FIG. 6 is a cross-sectional view of an ultrasonically cleaned hollow fiber membrane according to another embodiment of the present invention.

FIG. 6 is a cross-sectional view of an ultrasonically cleaned hollow fiber membrane according to another case of the present invention. In one case, the hollow fiber membrane element 610 comprises many fibers (e.g., each cycle 620 contains multiple fibers). In another case, the USWE transducers are adjacent 630 to hollow fiber membranes. In another case, the USWE transducers are inside 640 hollow fiber membranes. In other cases, the hollow fiber membranes are placed between sheets of USWE transducers which are adjacent to the fibers. For example, a plurality of layers of hollow fiber membranes may be sandwiched between a plurality of USWE transducers. During operation, the feed solution may either flow inside the hollow fiber membranes 610 with permeate collected outside the hollow fibers, or alternatively, flow outside the hollow fiber filtration membranes 610 with permeate collected inside the hollow fibers.

EXAMPLES

Methods and systems of the present disclosure may be applied to various types of membranes and other components.

Setup and Parameters

Figure 7:
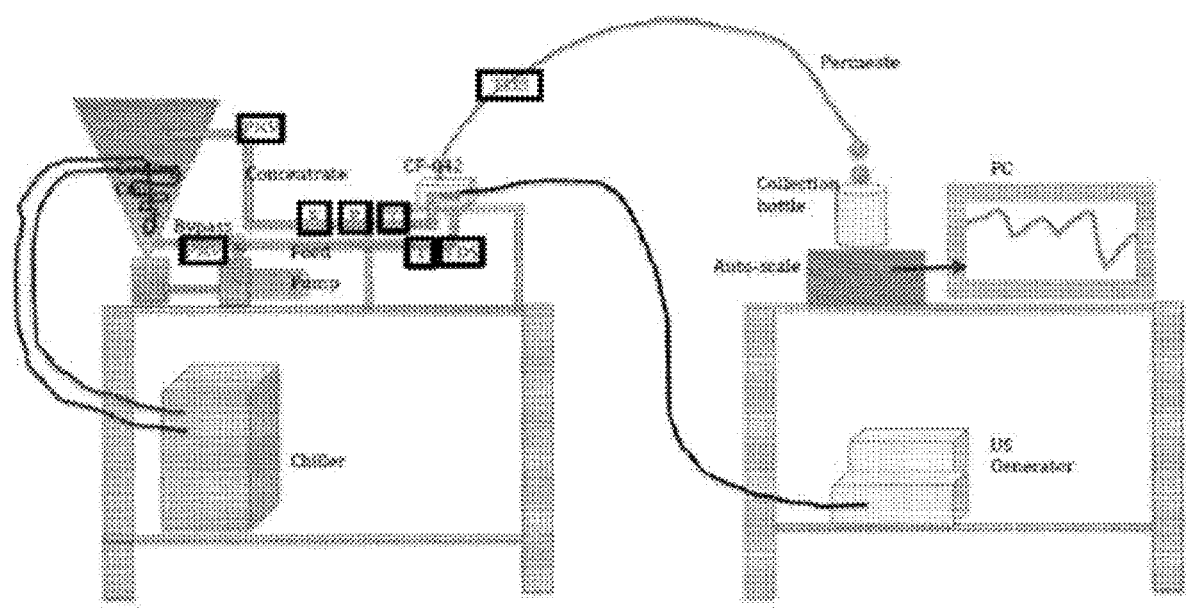
FIG. 7 illustrates one embodiment of the setup used to validate the concept that ultrasound reduces membrane fouling and concentration polarization.

FIG. 7 illustrates one embodiment of the setup used to validate the concept that ultrasound reduces membrane fouling, scaling, and concentration polarization. This setup uses an RO flat-sheet membrane, which is the key constituent of the commercial-scale spiral wound membrane elements.

Figure 8:
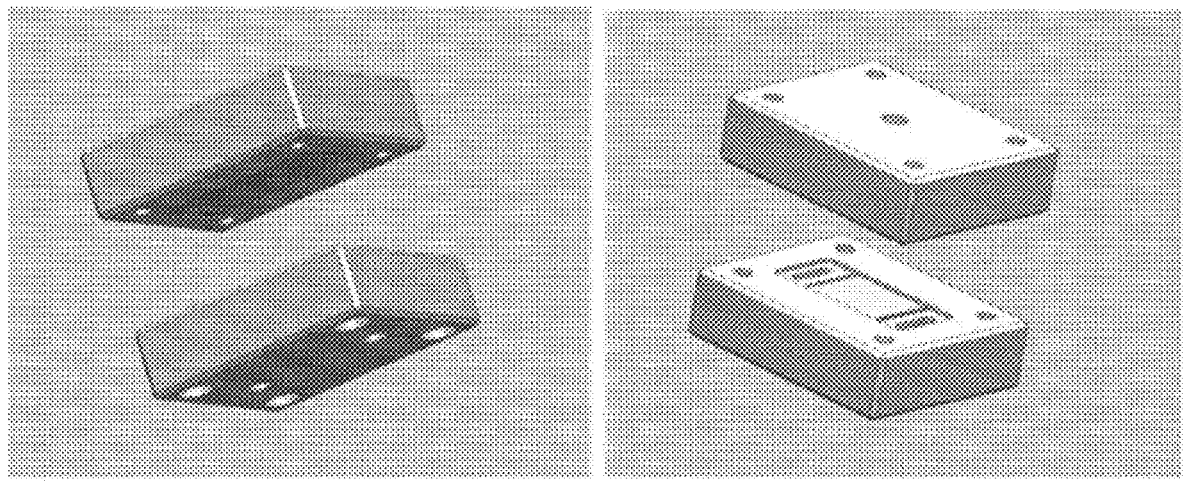
FIG. 8 is one embodiment of the key membrane elements.

FIG. 8 is one embodiment of a membrane element of the technology. The reverse osmosis test cell is comprised of a split block of delrin plastic held together by four bolts with reinforcing stainless steel plates. The internal water chamber is 85 mm by 39 mm by 2.4 mm deep. The top block of the cell holds a porous stainless steel plate which supports the RO membrane when under pressure. The design chosen to implement the ultrasound sonication is a parallel transducer adjacent to the RO membrane housed in the lower block of delrin.

The goal was to produce a broad band transducer to accommodate short pulses and also have the capability of running off resonance to support frequency sweeping or resonance optimization within the resonating chamber.

Ultrasonic vibration is utilized in seawater reverse osmosis (RO) membranes to prevent fouling and scaling. In this study, 32,000 ppm NaCl feed water was pressurized at 800 psi and filtered through an RO membrane flat sheet. In all tests, feed water temperature was maintained at 25° C. Unless otherwise noted, foulants and scalants are added approximately 60 minutes after the start of the run. ΔTDS (ppm) is calculated as the % change between the lowest (stabilized) TDS value and the TDS value after 700 minutes, unless otherwise noted. This amount of time is used for consistency in comparison.

The flux during salt baselines, humic acid (foulant)+salt runs, and humic acid+salt+UST. UST is tested at 431 kHz and 1.7 MHz frequencies and 0.2V, 0.5V, and 0.9V amplitudes. Other variables are held constant, or as constant as is feasible.

Example 1

Test Parameters, Example 1

| | |
|---|---|
| NaCl Concentration | 32,000 ppm |
| Foulant Concentration | 20 ppm Humic Acid |
| Reject Flow | 13-15 mL/s |
| Recovery | Very low |
| Membrane | NanoH2O |
| Frequency | 431 kHz |
| Amplitude | 0.5 V |
| Pulse or Continuous Wave (CW) | Pulse, 30 s on/off |
| Duration of USWE | ~700 min |

Test Results, Example 1

| Δ Permeate Flux (due to USWE) | Maintained higher flux, close to BL |
|---|---|
| Δ Permeate TDS ppm (USWE + HA, HA, BL) | 22, 30, 16 |

Figure 9:
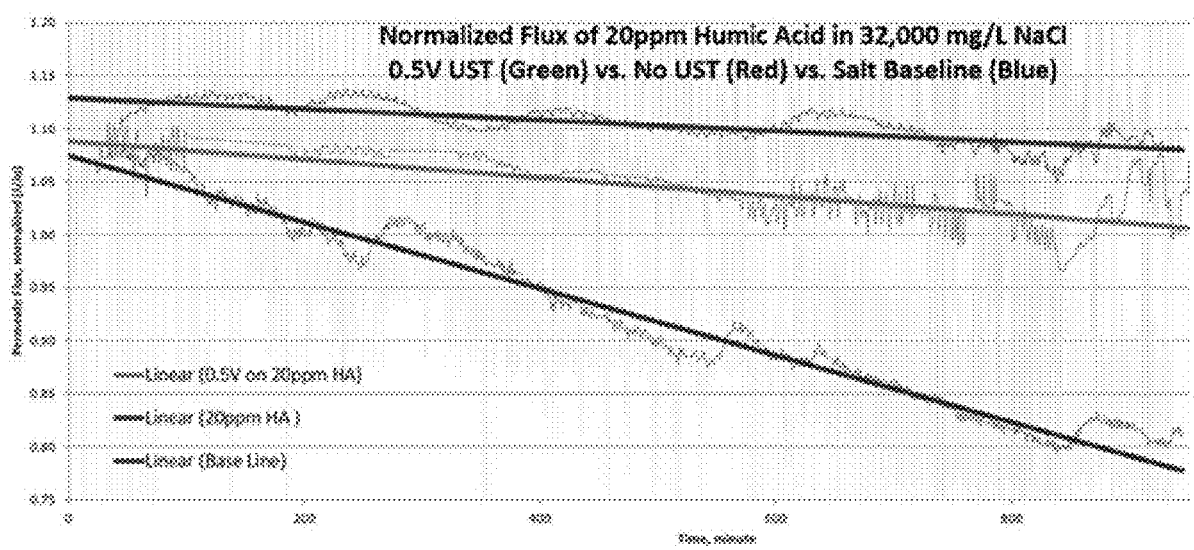
FIG. 9 illustrates a graph of a normalized flux of 20 ppm Humic Acid in 32,000 mg/L NaCl, 0.5V UST vs No UST vs salt baseline.

FIG. 9 illustrates results show a comparison of the effect of UST, 0.5V UST (green), no UST (red), and salt baseline (blue). Instant increase of permeate flux was observed when ultrasound wave energy (USWE) was applied (0.5V UST).

Example 2

Test Parameters, Example 2

| NaCl Concentration | 32,000 ppm |
|---|---|
| Foulant Concentration | 20 ppm Humic Acid |
| Reject Flow | 13-15 mL/s |
| Recovery | Very low |
| Membrane | NanoH2O |
| Frequency | 431 kHz |
| Amplitude | 0.2 V vs. 0.5 V vs. 0.9 V |
| Pulse or Continuous Wave (CW) | Pulse, 30 s on/off |
| Duration of USWE | ~600 min |

Test Results, Examples 2

| Δ Permeate Flux (due to USWE) | Maintained higher flux, close to BL |
|---|---|
| Δ Permeate TDS (0.2 V, 0.5 V, 0.9 V) | N/A, 22, 21 |

Figure 10:
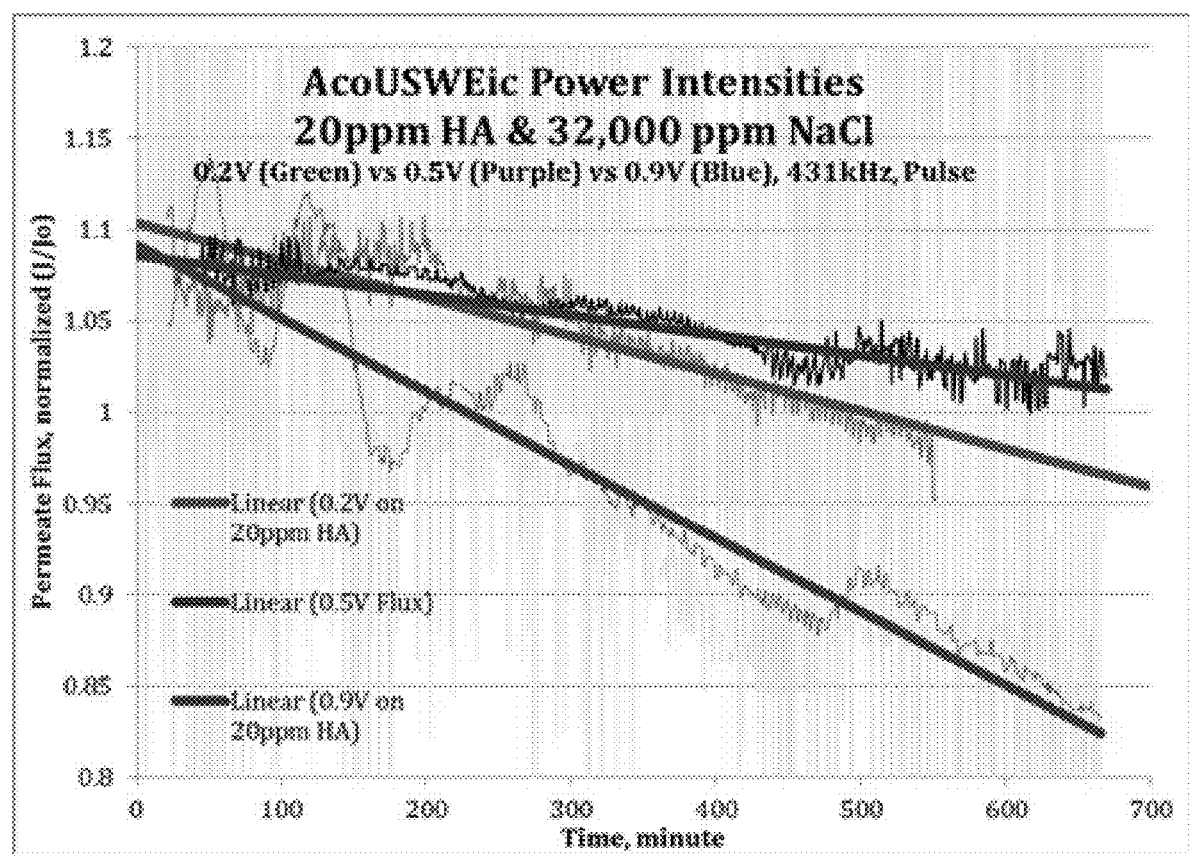
FIG. 10 illustrates a graph of USWE power intensities for 20 ppm HA and 32,000 ppm NaCl, 0.2V, 0.5V, and 0.9V, 431 kHz, pulse.

FIG. 10 illustrates results showing a comparison of the effect of USWE power intensity, 0.2V, 0.5V, and 0.9V signal amplitudes. Of these three amplitudes, 0.5V is the most effective amplitude for minimizing fouling Example 3

Test Parameters, Example 3

| NaCl Concentration | 32,000 ppm |
|---|---|
| Scalant Concentration | 1,000 ppm Calcium Carbonate |
| Reject Flow | 13-15 mL/s |
| Recovery | Very low |
| Membrane | NanoH2O |
| Frequency | 431 kHz |
| Amplitude | 0.9 V |
| Pulse or Continuous Wave (CW) | Pulse, 30 s on/off |
| Duration of USWE | ~1100 min |

Test Results, Example 3

| Δ Permeate Flux (due to USWE) | Maintained higher flux, closer to BL |
|---|---|
| Δ Permeate TDS (0.9 V + Scalant, Scalant, BL) In | 24, N/A, 16 |

Figure 11:
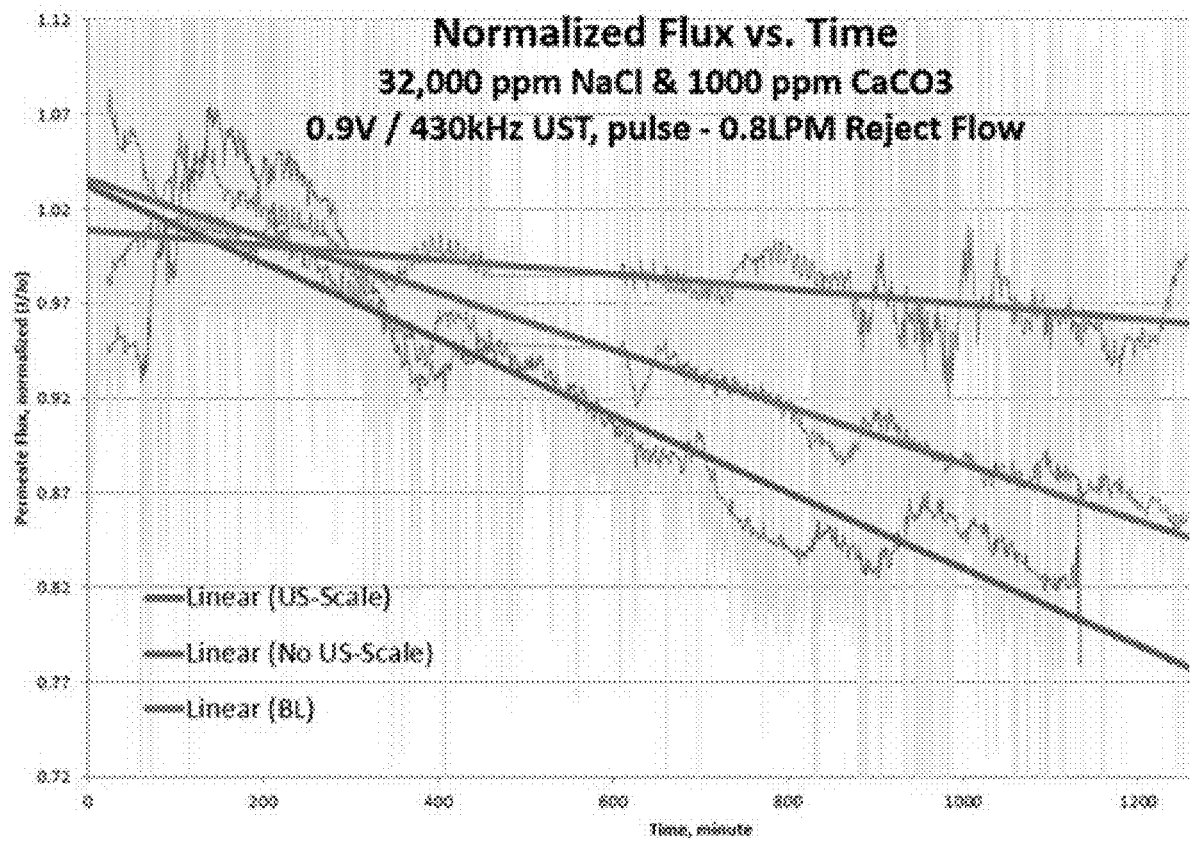
FIG. 11 illustrates a graph of normalized flux vs time for 32,000 ppm NaCl and 1000 ppm CaCO3, 0.9 v/430 kHz UST, pulse—0.8 LPM Reject Flow
Figure 12:
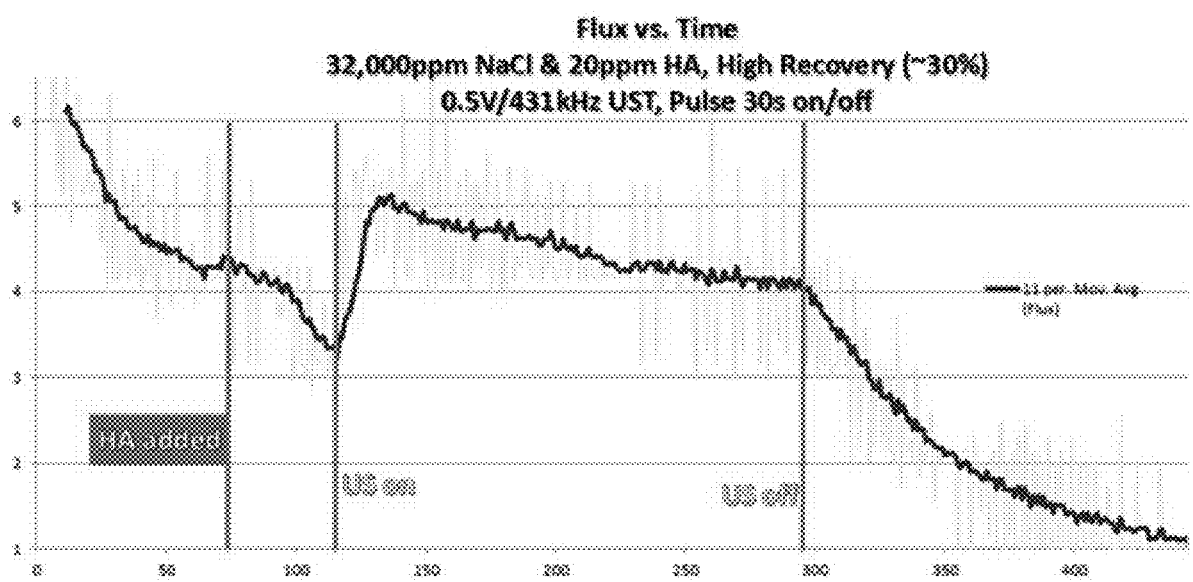
FIG. 12 illustrates a graph of flux vs time for 32,000 ppm NaCl and 20 ppm HA, High Recovery (~30%), 0.5V/431 kHz UST, Pulse 30 s on/off.
Figure 13:
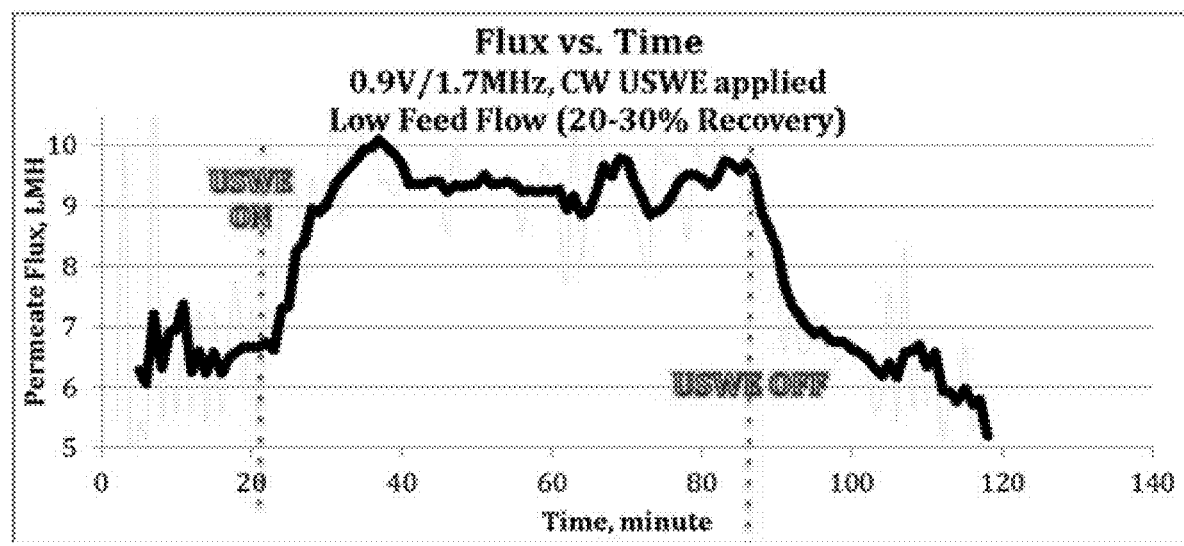
FIG. 13 illustrates a graph of flux vs time for 0.9V/1.7 MHz, CW USWE applied, low feed flow (20-30% recovery).
Figure 14:
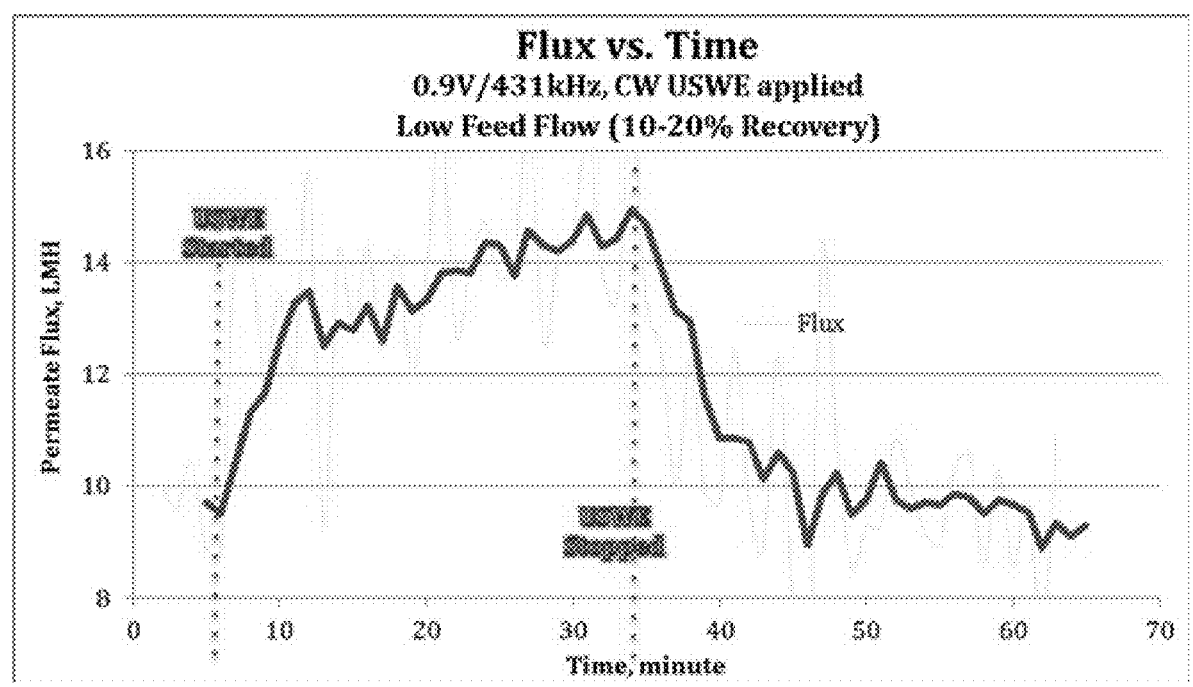
FIG. 14 illustrates a graph of flux vs time for 0.9 v/431 kHz, CW USWE applied, low feed flow (10-20% recovery).
Figure 15:
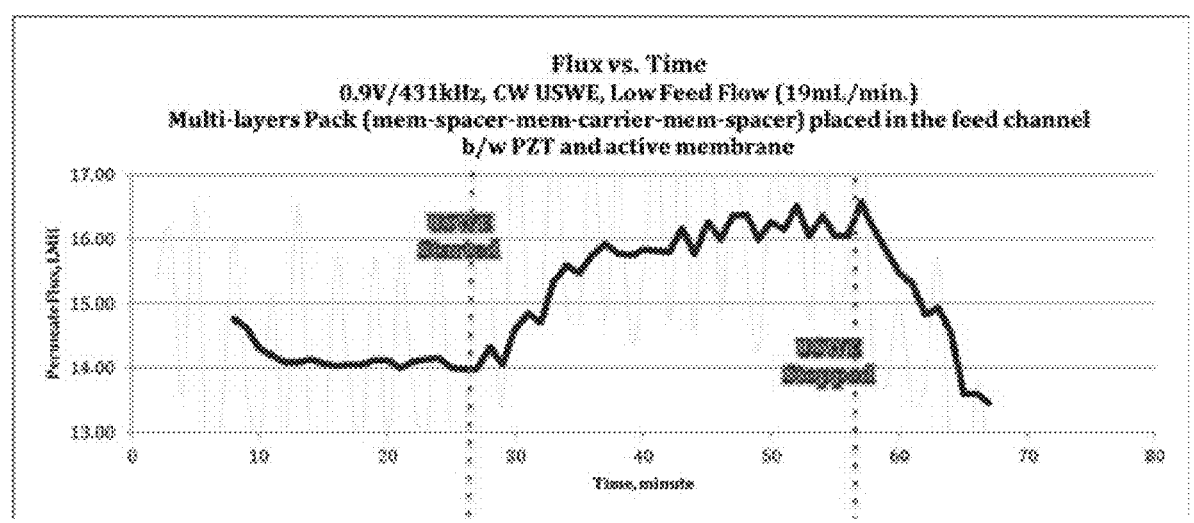
FIG. 15 illustrates a graph of flux vs time for 0.9 v/431 kHz, CW USWE applied, low feed flow (19 mL/min.), multi-layers pack (mem-spacer-mem-carrier-mem-spacer) placed in the feed channel between PZT and active membrane

FIG. 11 illustrates results showing USWE also maintains a higher relative flux when a scalant (calcium carbonate). For brackish water reverse osmosis (BWRO) applications, minimizing scaling is especially vital to optimal membrane performance and reduced operating costs.

Example 4

Test Parameters, Example 4

| NaCl Concentration | 32,000 ppm |
|---|---|
| Foulant Concentration | 20 ppm Humic Acid |
| Reject Flow | Very low |
| Recovery | ~30% |
| Membrane | NanoH2O |
| Frequency | 431 kHz |
| Amplitude | 0.5 V |
| Pulse or Continuous Wave (CW) | Pulse, 30 s on/off |
| Duration of USWE | 64 m |

Test Results, Example 4

| Δ % Permeate Flux (due to USWE) | ~50% |
|---|---|

Example 5

Test Parameters, Example 5

| NaCl Concentration | 32,000 ppm |
|---|---|
| Foulant Concentration | 0 |
| Reject Flow | 3-4 mL/min |
| Recovery | ~25% |

Test Results, Example 5

| Membrane | Toray |
|---|---|
| Frequency | 1.7 MHz |
| Amplitude | 0.9 V (max) |
| Pulse or Continuous Wave (CW) | CW |
| Duration of USWE | 64 m |
| Δ % Permeate Flux (due to | ~50% |

Example 6

Test Parameters, Example 6

| NaCl Concentration | 32,000 ppm |
|---|---|
| Foulant Concentration | 0 |
| Reject Flow | Very low |
| Recovery | ~15% |
| Membrane | NanoH2O |
| Frequency | 431 kHz |
| Amplitude | 0.9 V (max) |
| Pulse or Continuous Wave (CW) | CW |
| Duration of USWE | 28 m |

Test Results, Example 6

| Δ % Permeate Flux (due to USWE) | ~50% |
|---|---|

Example 7

Test Parameters, Example 7

| NaCl Concentration | 32,000 ppm |
|---|---|
| Foulant Concentration | 0 |

-continued

| | |
|---|---|
| Reject Flow | ~19 mL/min |
| Recovery | ~15% |
| Membrane | mem-spacer-mem-carrier-mem-spacer; NanoH2O |
| Frequency | 431 kHz |
| Amplitude | 0.9 V (max) |
| Pulse or Continuous Wave (CW) | CW |
| Duration of USWE | 30 m |

Test Results, Example 7

| | |
|---|---|
| Δ % Permeate Flux (due to USWE) | ~15% |

Results and Conclusion

FIGS. 12-15 illustrate results for Examples 4 through 7, respectively. The results are shown using this technology to minimize fouling and scaling of RO membranes. Examples 4-7, as illustrated in FIGS. 12-15 respectively, were conducted as quick tests using low-flow (high recovery) system settings to show that USWE can minimize fouling and concentration polarization.

Key Non-Limiting Observations:
1) USWE reduces membrane fouling, membrane scaling, and concentration polarization.
2) We see a relatively greater and more rapid positive effect of USWE when feed flow is low (and recovery is high) versus when feed flow is high (and recovery is low). We suspect this is because the membrane fouls much more quickly—due to greater concentration polarization—when cross-flow velocity is low, so the relative change in flux seen is greater.
3) At the amplitudes tested, USWE does not damage the membrane. This is determined by careful examination of the change in permeate TDS. Typical TDS % increase over 10-16 hours is about 10-15%, congruent with the natural decrease in reject flow. This is seen in the salt baseline, HA baseline, and USWE test. The permeate TDS % change is not greater with USWE than without.

It should be understood from the foregoing that, while particular implementations have been illustrated and described, various modifications may be made thereto and are contemplated herein. An embodiment of one aspect of the disclosure may be combined with or modified by an embodiment of another aspect of the disclosure. It is not intended that the invention(s) be limited by the specific examples provided within the specification. While the invention(s) has (or have) been described with reference to the aforementioned specification, the descriptions and illustrations of embodiments of the invention(s) herein are not meant to be construed in a limiting sense. Furthermore, it shall be understood that all aspects of the invention(s) are not limited to the specific depictions, configurations or relative proportions set forth herein which depend upon a variety of conditions and variables. Various modifications in form and detail of the embodiments of the invention(s) will be apparent to a person skilled in the art. It is therefore contemplated that the invention(s) shall also cover any such modifications, variations and equivalents.

What is claimed is:

1. A system, comprising:
a membrane element that prevents at least one species in solution from passing through the membrane element, wherein the membrane element comprises one or more membranes and at least one permeate carrier;
an ultrasound generating device that includes an ultrasound transducer that generates and directs ultrasound wave energy (USWE) to the membrane;
an energy delivering mechanism that is electrically coupled to the ultrasound transducer, the energy delivering mechanism to deliver energy to the ultrasound transducer; and
a container that houses the membrane, the ultrasound transducer, and the energy delivering mechanism, wherein the ultrasound transducer is embedded within materials of the one or more membranes or materials of the at least one permeate carrier.

2. The system of claim 1, wherein the system is configured in one of a spiral wound element, a plate-and-frame element, or a hollow fiber element.

3. The system of claim 2, wherein the membrane associated with the plate-and-frame element corresponds to a plurality of flat-sheet membranes, and
wherein, the plate-and-frame element comprises of a stacking of the plurality of flat-sheet membranes, and
wherein the ultrasound transducer is located between or adjacent at least one flat-sheet membrane of the plurality of flat-sheet membranes.

4. The system of claim 3, further comprising at least one reflective layer that is positioned within or attached to at least one flat-sheet membrane of the plurality of flat-sheet membranes.

5. The system of claim 2, wherein the membrane associated with the hollow fiber element comprises of a plurality of hollow fiber membranes that are positioned within the container, a first longitudinal axis of individual hollow fiber membranes of the plurality of hollow fiber membranes being parallel to a second longitudinal axis of the container,
wherein the hollow fiber element corresponds to a first ingress-egress configuration and a second ingress-egress configuration, the first ingress-egress configuration corresponding to flow ingress through the plurality of hollow fiber membranes such that a permeate is collected outside the plurality of hollow fiber membranes, and
the second ingress-egress configuration corresponding to flow ingress outside the plurality of hollow fiber membranes such that the permeate is collected inside the plurality of hollow fiber membranes.

6. The system of claim 5, wherein, the hollow fiber element further comprises at least one reflective layer that is configured to redirect USWE from the ultrasound transducer to the plurality of hollow fiber membranes, the at least one reflective layer being embedded within the container or positioned adjacent to the container.

7. The system of claim 2, wherein the spiral wound element further comprises a permeate tube that is positioned within the container, a longitudinal axis of the permeate tube being parallel to a centerline of the container, wherein the membrane is positioned between the permeate tube and an inner surface of the container, and
wherein the ultrasound transducer is embedded within the permeate tube.

8. The system of claim 1, wherein the membrane comprises one of a microfiltration membrane, a nanofiltration membrane, an ultrafiltration membrane, or a reverses osmosis membrane.

9. The system of claim 7, further comprising:
at least one reflective layer that is positioned within the container, the at least one reflective layer being configured to redirect USWE from the ultrasound transducer to the membrane; and at least one of an anti-telescoping device or an interconnector that is configured to prevent the membrane from unraveling or overextending.

10. The system of claim 2, wherein the spiral wound element further comprises at least one anti-telescoping device that is positioned at longitudinal end of the container, and
wherein, the energy delivering mechanism further includes a wire that is routed from the at least one anti-telescoping device to the ultrasound transducer.

11. The system of claim 2, wherein the spiral wound element further comprises an interconnector, and
wherein the energy delivering mechanism includes a wire that is routed from the interconnector to the ultrasound transducer.

12. The system of claim 1, wherein the energy delivering mechanism is embedded in the container or attached to the container, the energy delivering mechanism being further connected to the ultrasound transducer, and
wherein, the ultrasound transducer is oriented to direct USWE inward towards the membrane.

13. The system of claim 1, wherein the container is a pressure vessel, and the energy delivering mechanism is a wireless device that is embedded within the pressure vessel or located outside the pressure vessel, the wireless device being configured to direct USWE towards the membrane within the pressure vessel.

14. The system of claim 1, further comprising at least one reflective layer that is positioned within the container, the at least one reflective layer being configured to redirect USWE from the ultrasound transducer to the membrane.

15. The system of claim 14, wherein the at least one reflective layer is disposed between the container and the membrane.

16. The system of claim 1, wherein the ultrasounde transducer creates a pulsing ultrasound wave.

17. The system of claim 1, wherein the ultrasound transducer comprises a lead zirconium titanate (PZT).

18. The system of claim 1, further comprising a permeate carrier, and
wherein the energy delivering mechanism is located on the permeate carrier or embedded within the permeate carrier.

19. The system of claim 1, wherein the ultrasound generating device further comprises one of a conductive fabric or a conductive mesh material.

20. The system of claim 1, wherein the ultrasound transducer is configured to adjust at least one of USWE amplitude or USWE frequency.

21. The system of claim 1, wherein the membrane comprises of a hollow fiber membrane element that comprises of a plurality of hollow fiber membranes, and
wherein, the ultrasound transducer is embedded within an inner wall of at least on hollow fiber of the plurality of hollow fibers.

22. A system, comprising:
a hollow fiber membrane element that comprises of a plurality of hollow fiber membranes that prevent at least one species in solution from passing through the hollow fiber membrane element;
one or more ultrasound transducers that generate and direct ultrasound wave energy (USWE) to the membrane, wherein at least one ultrasound transducer of the one or more ultrasound transducers is embedded within an inner wall of at least one hollow fiber membrane of the plurality of hollow fiber membranes;
an energy delivering mechanism that is electrically coupled to the one or more ultrasound transducers, the energy delivering mechanism to delivery energy to the one or more ultrasound transducers; and
a container that houses the hollow fiber membrane element.

23. The system of claim 22, wherein metallic particles are embedded within the membrane to reduce ultrasound attenuation.

24. The system of claim 1, wherein the energy delivering mechanism comprises a wire located in a groove on the inner surface of the container, the wire connecting to the ultrasound transducer.

25. The system of claim 1, wherein the energy delivering mechanism comprises a wire that is embedded within a material of the container, the wire further connecting to the ultrasound transducer.

26. The system of claim 1, wherein metallic particles are embedded within the membrane to reduce ultrasound attenuation.

27. The system of claim 1, wherein the container is a reflective layer that is configured to redirect USWE from a first position of the ultrasound transducer to a next position within the container.

28. The system of claim 10, wherein the ultrasound transducer is embedded within the anti-telescoping device.

29. The system of claim 1, wherein the ultrasound transducer is embedded on an outer perimeter of the membrane.

30. The system of claim 1, wherein the reflective layer is positioned outside the container.

31. The system of claim 1, further comprising an additional ultrasound transducer attached to an outer surface of the container, an inner surface of the container, or materials of the membrane.

32. The system of claim 22, further comprising an additional ultrasound transducer attached to an outer surface of the container, an inner surface of the container, or materials of the membrane.

33. The system of claim 1, wherein the conductive fabric or the conductive mesh material comprises one of polyvinylidene difluoride, polyester, or propylene.

* * * * *